Patented May 4, 1954

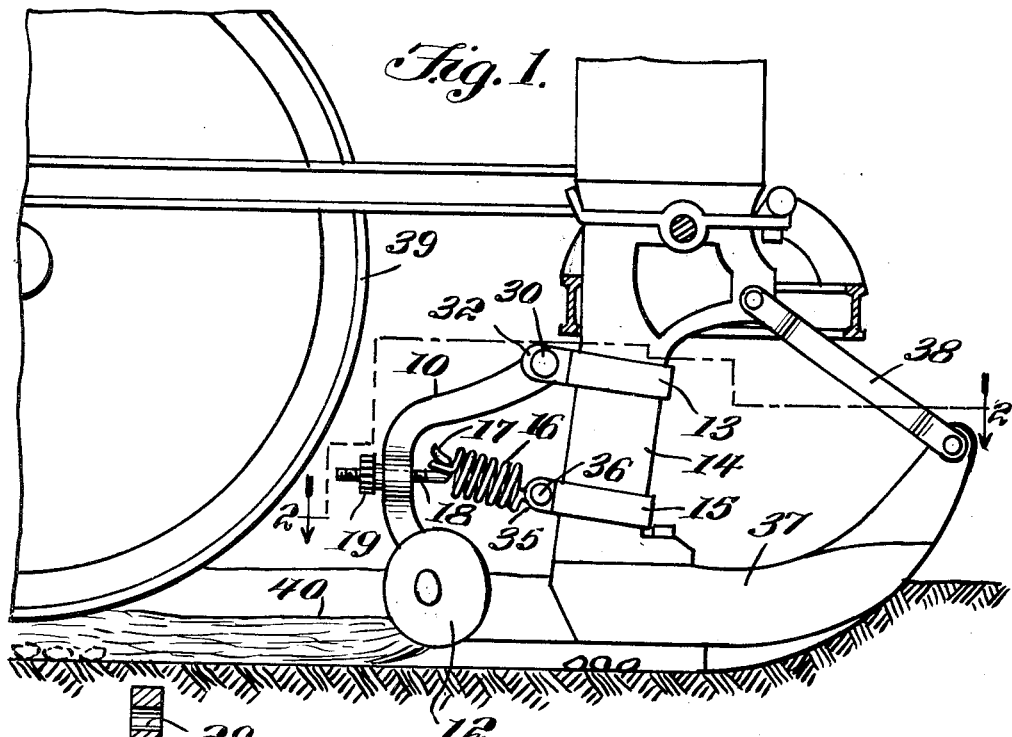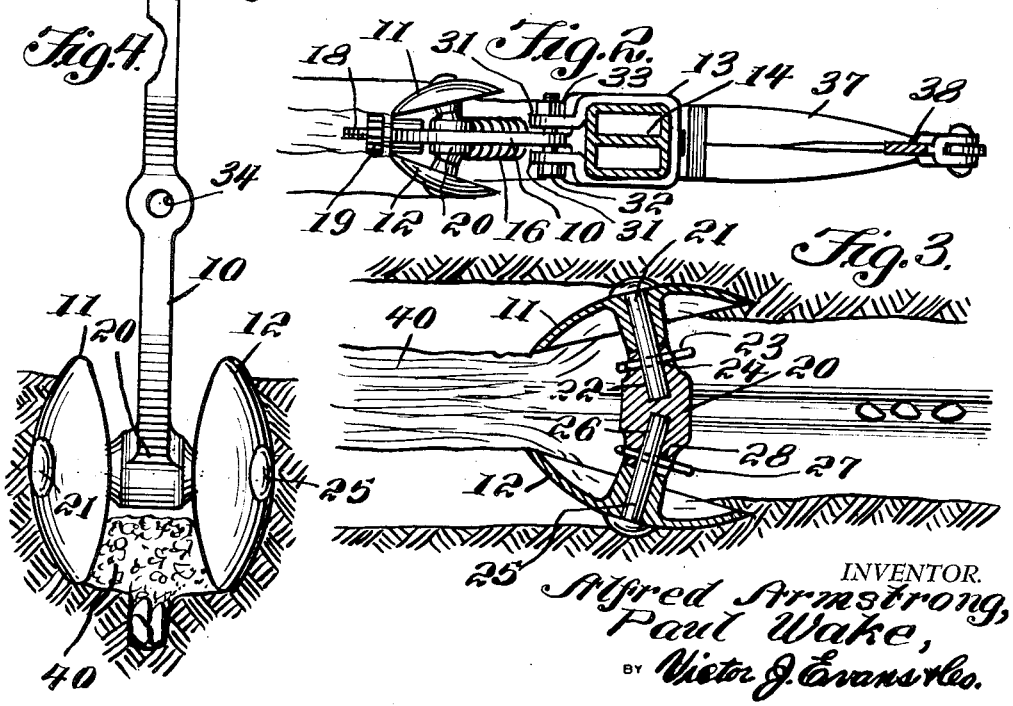

2,677,339

UNITED STATES PATENT OFFICE 2,677,339

PLANTER SEED COVERING ATTACHMENT

Alfred Armstrong and Paul Wake, Loami, Ill.

Application September 20, 1951, Serial No. 247,496

1 Claim. (Cl. 111—85)

This invention relates to planters of the type where seed is dropped through boots into a seed trench opened by shoes carried by the boots, and in particular a pair of auxiliary discs carried by an arm clamped on the boot of a planter and positioned whereby the discs assist conventional discs cutting into the soil at the sides of the seed trench and drawing a small amount of soil directly over the seed to insure a positive cover over the seed.

The purpose of this invention is to provide means for positively covering seed dropped by a planter when the planter is operating in muck, gumbo and the like or in other types of soil where the soil does not readily drop by gravity from the heels of the boot of the planter to cover the seed.

With the conventional type of planter the soil is drawn inwardly by discs and drops freely by gravity over seed in a trench from the heels of the shoe carried by the seed boot of the planter when the planter is operating in comparatively soft, loamy soil, however, when the planter is operating in muck or gumbo the soil spread by the shoe is thrust laterally, forming walls and the soil drawn by the discs does not cover all of the seed in the seed trench.

This invention contemplates a planter having a boot with a pair of discs suspended from the boot, in addition to the conventional discs and positioned to follow the trailing ends of the heels of the shoe on the lower end of the boot whereby the soil is gathered up or cut by the discs and drawn into the center to form a ridge over the seed trench.

The object of this invention is, therefore, to provide means adapted to follow the boot of a planter for gathering up soil from the sides of a seed trench, which is positioned to deposit the soil over the trench.

Another object of the invention is to provide an attachment for positively covering seed from a seed planter that may be attached to planters now in use without changing the parts thereof.

A further object of the invention is to provide a positive seed covering attachment for planters which is of a simple and economical construction.

With these and other objects and advantages in view the invention embodies a pair of discs carried by the lower ends of an arm pivotally mounted by a clamp on the boot of a planter with the arm resiliently held by a spring extended from another clamp on the boot and with means for adjusting the tension of said spring.

Other features and advantages of the invention will appear from the following description taken in connection with the drawing wherein:

Figure 1 is a side elevational view showing the boot of a planter with the attachment of this invention mounted on the boot and with the soil through which the planter is traveling shown in section.

Figure 2 is a sectional plan through the boot taken on line 2—2 of Figure 1, showing a plan view of the attachment with the attachment mounted on the boot.

Figure 3 is a sectional plan on an enlarged scale illustrating the position of the discs with the planter operating.

Figure 4 is a rear elevational view of the seed covering attachment of the planter with the planter and other parts omitted.

Referring now to the drawings wherein like reference characters denote corresponding parts the improved seed planter attachment of this invention includes a C-shaped arm 10 having discs 11 and 12 journaled on the lower end, a clamp 13 by which the arm 10 is pivotally mounted on the boot of the planter, as indicated by the numeral 14, and a lower clamp 15 for holding one end of a spring 16, the opposite end of which is attached to a hook 17 of a threaded bolt 18 that is secured in the arm 10 with a knurled nut 19.

The arm 10 is formed as illustrated in Figures 1 and 3 with a hub 20 at the lower end on which the discs 11 and 12 are mounted, the disc 11 being mounted with a stud 21 that extends into a socket 22 in the hub 20 and that is secured in position by a pin 23 which extends through the stud and through an opening 24 in the hub.

The disc 12 is journaled on a similar stud 25 which extends into a socket 26 in the hub and which is secured in position by a pin 27 that extends through an opening 28 in the hub. By this means the discs 11 and 12 are removably mounted on the lower end of the arm 10 and the disc may be removed and replaced as desired.

The upper end of the arm 10 is provided with an opening 29 through which a bolt 30 extends and the bolt also extends through extensions or ears 31 and 32 or on the ends of the clamp 13 whereby the clamp is secured on the boot 14 and the arm 10 is pivotally mounted thereon. The bolt 30 is provided with a nut 33.

The arm 10 is also provided with an opening 34 in which the stud 18 is positioned and with the stud adjustably mounted in the opening tension of the spring 16 is attached to an extension or lug 35 on the clamp 15 by a bolt 36.

The boot 14 of the planter is provided with a shoe 37, the forward end of which is attached to the upper part of the boot with a brace 38. The boot is followed by a covering wheel 39.

With the parts arranged in this manner the discs 11 and 12 cut or slice through the soil removing the soil from both sides of the seed trench breaking up lumps and pulverizing the soil and drawing thereby the soil together at the center to place a fine stream of soil over the seed, forming a ridge, as indicated by the numeral 40 whereby a positive covering is provided for the seed and with the covering packed by the wheel 39 the loss of seed is reduced to a minimum.

It will be understood that modifications may be made in the design and arrangement of the parts without departing from the spirit of the invention.

What is claimed is:

In a planter, a boot, a shoe secured to the lower end of said boot, an inclined brace extending between said shoe and boot and secured thereto, an upper clamp connected to said boot and including a pair of inwardly offset ears on its rear end, a C-shaped arm having its upper end pivotally mounted between said pair of ears, a hub on the lower end of said arm, there being a pair of sockets extending inwardly from the ends of said hub, said sockets being arranged angularly with respect to each other, a stud seated in each of said sockets and having a head on its outer end, a disc mounted on each of said studs and interposed between said head and hub, pins extending through said studs and hub and arranged at right angles with respect to the studs, a second clamp arranged on said boot in spaced parallel relation below said first clamp and including inwardly offset lugs on its rear end, a coil spring having its front end pivotally mounted between said lugs, said C-shaped arm being provided with an opening intermediate its ends, a threaded bolt extending through the opening in said arm, a securing element arranged in engagement with the rear end of said bolt, and a hook on the front end of said bolt connected to the rear end of said spring.

References Cited in the file of this patent
UNITED STATES PATENTS

| Number | Name | Date |
| --- | --- | --- |
| 719,823 | Lindgren | Feb. 3, 1903 |
| 808,000 | Brennan | Dec. 19, 1905 |
| 886,665 | Taylor | May 5, 1908 |
| 1,021,017 | Thrush | Mar. 26, 1912 |
| 1,084,307 | Altgelt | Jan. 13, 1914 |
| 1,293,603 | Wooldridge | Feb. 4, 1919 |
| 1,524,369 | Ramage | Jan. 27, 1925 |
| 1,573,800 | Boullion et al. | Feb. 23, 1926 |